United States Patent
Ota et al.

(10) Patent No.: US 9,290,078 B2
(45) Date of Patent: Mar. 22, 2016

(54) AIR CONDITIONER FOR VEHICLE

(75) Inventors: Koji Ota, Kariya (JP); Manabu Maeda, Nagoya (JP); Yuji Kawazoe, Kariya (JP); Shinji Iwama, Nagoya (JP)

(73) Assignee: DENSO CORPORATION, Kariya, Aichi-pref (JP)

( * ) Notice: Subject to any disclaimer, the term of this patent is extended or adjusted under 35 U.S.C. 154(b) by 808 days.

(21) Appl. No.: 13/591,544

(22) Filed: Aug. 22, 2012

(65) Prior Publication Data

US 2013/0059522 A1  Mar. 7, 2013

(30) Foreign Application Priority Data

Sep. 3, 2011 (JP) ................................ 2011-192180

(51) Int. Cl.
*B60H 1/02* (2006.01)
*B60H 1/00* (2006.01)
*B60H 1/22* (2006.01)

(52) U.S. Cl.
CPC .......... *B60H 1/00842* (2013.01); *B60H 1/2218* (2013.01); *B60H 2001/225* (2013.01); *B60H 2001/2237* (2013.01)

(58) Field of Classification Search
CPC ......................... B60H 1/00842; B60H 1/2218
USPC ......................................... 454/159, 127, 152
See application file for complete search history.

(56) References Cited

U.S. PATENT DOCUMENTS

| | | | |
|---|---|---|---|
| 5,137,213 A * | 8/1992 | Yamamoto et al. ........... 237/2 A |
| 6,002,105 A * | 12/1999 | Tamada ........................ 219/202 |
| 6,078,024 A | 6/2000 | Inoue et al. |
| 6,105,667 A * | 8/2000 | Yoshinori et al. ............. 165/202 |
| 6,166,351 A * | 12/2000 | Yamamoto .................... 219/202 |
| 7,222,667 B2 * | 5/2007 | Fujiki et al. .................. 165/202 |
| 7,478,666 B2 * | 1/2009 | Yamamoto ...................... 165/42 |
| 7,806,172 B2 * | 10/2010 | Seki et al. ..................... 165/202 |
| 2005/0056413 A1 * | 3/2005 | Homan et al. ................ 165/203 |
| 2005/0136824 A1 * | 6/2005 | Okumura et al. ............. 454/156 |
| 2009/0078400 A1 * | 3/2009 | Tamura et al. ................ 165/287 |

(Continued)

FOREIGN PATENT DOCUMENTS

| | | |
|---|---|---|
| JP | 56-131416 | 10/1981 |
| JP | 62-056309 | 4/1987 |

(Continued)

OTHER PUBLICATIONS

Office action dated Jun. 24, 2014 in corresponding Japanese Application No. 2011-192180.

*Primary Examiner* — Steven B McAllister
*Assistant Examiner* — Jonathan Cotov
(74) *Attorney, Agent, or Firm* — Harness, Dickey & Pierce, P.L.C.

(57) ABSTRACT

An air conditioner for a vehicle includes an electric heater arranged downstream of a heat exchanger in an air flow direction, a defroster air outlet, a driver-foot air outlet through which air is blown toward a foot area of a driver, a knee air outlet through which air is blown toward a knee area of the driver, a door device which controls an air amount blown into a vehicle compartment by opening or closing the air outlets. When an immediate heating operation is performed by an operation of an immediate heating switch, the door device opens the defroster air outlet and at least one of the driver-foot air outlet and the knee air outlet, and the electric heater heats a total amount of air that is to be blown through the at least one of the driver-foot air outlet and the knee air outlet.

9 Claims, 6 Drawing Sheets

(56) References Cited

U.S. PATENT DOCUMENTS

2011/0005255 A1* 1/2011 Tanihata et al. .............. 62/238.7
2011/0284202 A1* 11/2011 Hirai .................. B60H 1/00742
                                                            165/287
2012/0234932 A1* 9/2012 Okamoto ................ F24H 3/002
                                                            237/2 R

FOREIGN PATENT DOCUMENTS

| JP | S62-56309 | * 12/1987 |
| JP | 10-119549 | 5/1998 |
| JP | 2 3750255 | 3/2006 |
| JP | 2 3772470 | 5/2006 |
| JP | 2008-296717 | 12/2008 |

* cited by examiner

AIR CONDITIONER FOR VEHICLE

CROSS REFERENCE TO RELATED APPLICATION

This application is based on and incorporates herein by reference Japanese Patent Application No. 2011-192180 filed on Sep. 3, 2011.

TECHNICAL FIELD

The present disclosure relates to an air conditioner for a vehicle, which has an electric heater and can perform an immediate heating operation for a driver.

BACKGROUND

Conventionally, an air conditioner for a vehicle, described in Patent Document 1 (JP 3750255 B2), is known. The air conditioner includes an electric heater as an auxiliary heater, which is arranged between a heating heat exchanger and a foot air outlet to compensate for a lack of heating capacity of the air conditioner.

The air conditioner can be set in an inside-outside air double-layer mode, in which inside air and outside air flow separately inside the air conditioner. The electric heater is arranged in a space where the inside air flows in the double-layer mode.

When a maximum heating (MAX-HOT) operation is performed, all amount of air to be blown out of the air conditioner may be heated in the electric heater. However, when a heating operation other than the maximum heating operation is performed, the air heated in the electric heater may be mixed with cool air not-heated by the electric heater.

Hence, the air mixed with cool air may be blown to a driver just entered into a vehicle compartment of the vehicle from cold outside. In this case, a capacity of the air conditioner to heat the driver may be reduced. Therefore, a vehicle air conditioner is required, which is capable of effectively performing an effective immediate heating operation in accordance with a requirement of a driver even when it is unnecessary to perform a maximum heating for a vehicle compartment.

SUMMARY

According to an aspect of the present disclosure, an air conditioner for a vehicle includes an air-conditioning heat exchanger, an electric heater, a defroster air outlet, a driver-foot air outlet, a knee air outlet, a door device and an immediate heating switch. The air-conditioning heat exchanger is arranged in a duct inside the vehicle, and the air-conditioning heat exchanger is configured to exchange heat with air blown by a blower. The electric heater is arranged downstream of the air-conditioning heat exchanger inside the duct in an air flow direction, to heat air passing through the electric heater. The defroster air outlet is provided downstream of the air-conditioning heat exchanger in the air flow direction to serve as a port through which air, passed through the air-conditioning heat exchanger, is blown out of the duct into a vehicle compartment toward an inner surface of a windshield of the vehicle. The driver-foot air outlet is provided downstream of the electric heater in the air flow direction to serve as a port through which air, passed through the air-conditioning heat exchanger and the electric heater, is blown out of the duct into the vehicle compartment toward a foot area of a driver. The knee air outlet is provided downstream of the electric heater in the air flow direction to serve as a port through which air, passed through the air-conditioning heat exchanger and the electric heater, is blown out of the duct into the vehicle compartment toward a knee area of the driver. The door device is configured to control an air amount blown into the vehicle compartment through the defroster air outlet, the driver-foot air outlet and the knee air outlet by opening or closing the defroster air outlet, the driver-foot air outlet and the knee air outlet. The immediate heating switch is operative to command an immediate heating operation. The door device opens the defroster air outlet and at least one of the driver-foot air outlet and the knee air outlet, and the electric heater heats a total amount of air that is to be blown into the vehicle compartment through the at least one of the driver-foot air outlet and the knee air outlet, when the immediate heating operation is performed.

Accordingly, a temperature of air blown through the air outlets can be increased at an early stage of the immediate heating operation, and warm air can be blown to the driver effectively.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION

Embodiments of the present disclosure will be described hereinafter referring to drawings. In the embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Figure 1:
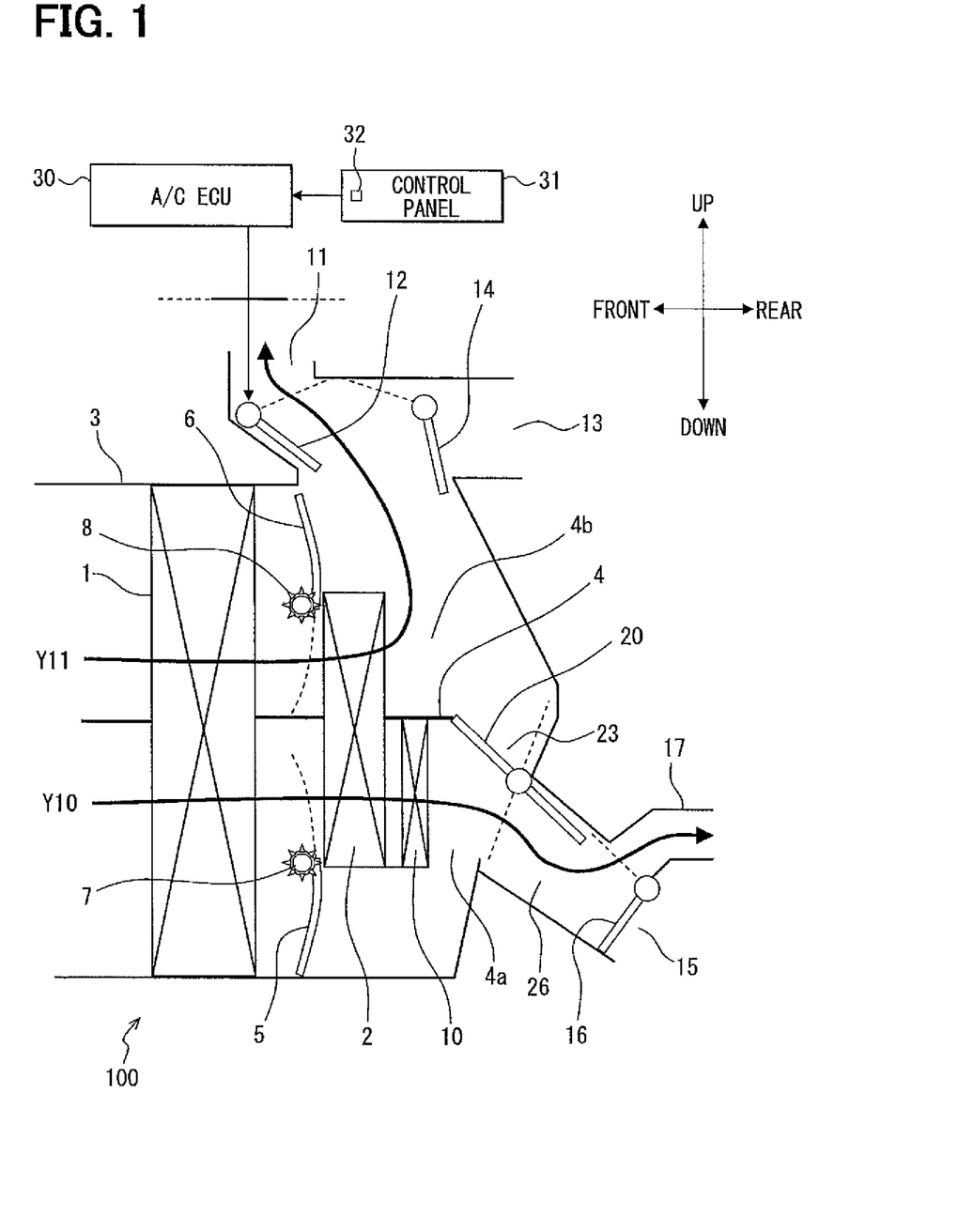
FIG. 1 is a schematic sectional view showing a part of an air conditioner for a vehicle, located on a front side of a driver seat, according to a first embodiment of the present disclosure.

A first embodiment of the present disclosure will be described with reference to FIGS. 1 to 7. An upward arrow of a vertical two-headed arrow shown in FIG. 1 is directed to a ceiling of a vehicle, and a downward arrow of the vertical two-headed arrow is directed to a bottom of the vehicle, i.e., the ground. A leftward arrow of a lateral two-headed arrow shown in FIG. 1 is directed to a front side of the vehicle, and a rightward arrow of the lateral two-headed arrow is directed to a rear side of the vehicle. In the present embodiment, an air conditioner 100 is typically applied to a vehicle having a right steering wheel. FIG. 1 shows a driver-seat side part of the air conditioner 100 for the vehicle.

The air conditioner 100 includes an air-conditioning heat exchanger, such as a cooling heat exchanger 1 (evaporator) and a heating heat exchanger 2 (heater core), inside a duct 3. The cooling heat exchanger 1 is accommodated in the duct 3 to cool air, and the heating heat exchanger 2 is accommodated in the duct 3 and arranged downstream of the cooling heat exchanger 1 in an air flow direction to heat air having passed through the cooling heat exchanger 1.

The air conditioner 100 further includes an inside air inlet and an outside air inlet, which are provided at a front side of the air conditioner 100. Inside air, i.e., air inside the vehicle compartment is introduced into the duct 3 through the inside air inlet. Outside air, i.e., air outside the vehicle compartment is introduced into the duct 3 through the outside air inlet. The air conditioner 100 further includes a blower which is not shown in the drawings and blows air from the inside air inlet and the outside air inlet toward the cooling heat exchanger 1.

The blower is separated into a first portion, which blows air to a lower space 4a of the duct 3, and a second portion, which blows air to an upper space 4b of the duct 3. Thus, the blower is capable of blowing air to the lower and upper spaces 4a, 4b (upper-lower double-layer space) separately.

Therefore, the air conditioner 100 can be set in an inside-outside air double-layer mode as an air inlet mode. In the inside-outside air double-layer mode, as shown in FIG. 1, inside air Y10 is introduced into a lower air passage of the duct 3, i.e., the lower space 4a of the duct 3, and outside air Y11 is introduced into an upper air passage, i.e., the upper space 4b of the duct 3.

As shown in FIG. 1, the air conditioner 100 further includes a partition plate 4 which divides an inside space of the duct 3 into the lower and upper spaces 4a, 4b so that an air flow passing through both the cooling and heating heat exchangers 1, 2 is separated into an upper air flow in the upper space 4b and a lower air flow in the lower space 4a. That is, the cooling and heating heat exchangers 1, 2 penetrate through the partition plate 4 to be positioned in both the lower and upper spaces 4a, 4b. The air conditioner 100 further includes air mix doors 5, 6, which are provided respectively in the lower space 4a and the upper space 4b and are arranged between the cooling heat exchanger 1 and the heating heat exchanger 2 in the air flow direction. A communication passage 23 is provided at a rear side (i.e., downstream side) of the partition plate 4 inside the duct 3, such that the lower and upper spaces 4a, 4b communicate with each other through the communication passage 23.

The air mix doors 5, 6 are slide doors which are slidable by rotation of gears 7, 8 actuated by an actuator (not shown), and the air mix doors 5, 6 can be operated to control a flow amount of air passing through the heating heat exchanger 2. By using the air mix doors 5, 6, temperatures in the lower and upper spaces 4a, 4b can be adjusted respectively independently.

The air conditioner 100 further includes an electric heater 10 which is arranged downstream of the heating heat exchanger 2 below the partition plate 4, as shown in FIG. 1. Thus, the electric heater 10 is capable of heating the lower space 4a mainly.

Hence, heat of the electric heater 10 can be delivered with the inside air and can be used effectively for immediate heating of a driver when the air conditioner 100 is set in a mode (e.g., inside air circulating mode or the inside-outside air double-layer mode), in which outside air is not introduced into the lower space 4a below the partition plate 4.

The air conditioner 100 further includes a defroster air outlet 11 and a defroster door 12. The defroster air outlet 11 is provided on an upper side of the duct 3, and conditioned air is blown out of the duct 3 through the defroster air outlet 11 toward an inner surface of a windshield of the vehicle. The defroster door 12 is arranged upstream of the defroster air outlet 11 in the air flow direction, and is opened or closed to control a flow amount of conditioned air blown out of the duct 3 through the defroster air outlet 11.

The air conditioner 100 further includes a face air outlet 13 and a face door 14. The face air outlet 13 is provided adjacent to the defroster air outlet 11, and conditioned air is blown out of the duct 3 through the face air outlet 13 toward a head area of a passenger in the vehicle compartment. The face door 14 adjusts a flow amount of air passing through the face air outlet 13.

Figure 2:
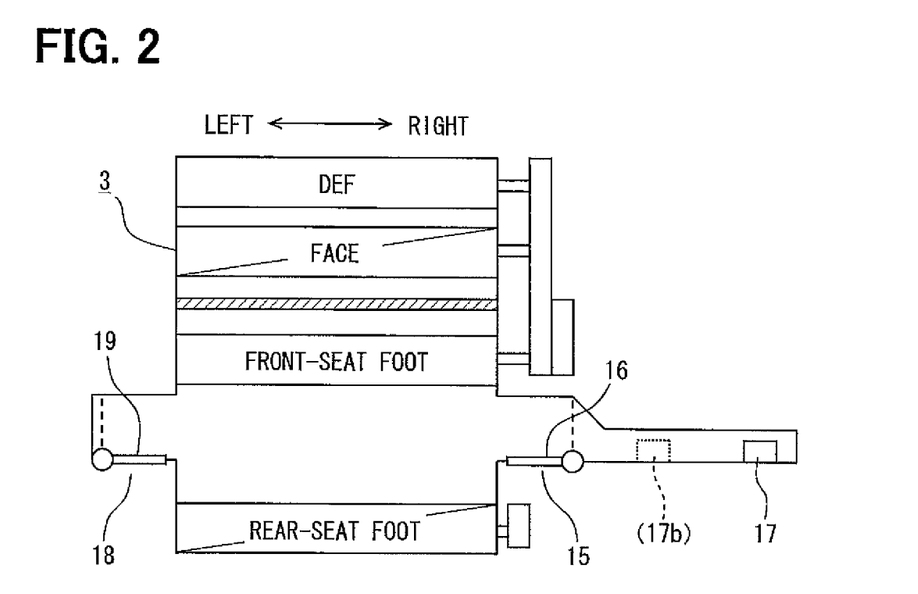
FIG. 2 is a schematic diagram showing the air conditioner when being viewed from a vehicle compartment, according to the first embodiment.

The air conditioner 100 further includes a driver-foot air outlet 15, a driver-foot door 16, a passenger-foot air outlet 18 and a passenger-foot door 19, as shown in FIGS. 1 and 2. The driver-foot air outlet 15 is provided on a rear side of the duct 3, and conditioned air passed through the heating heat exchanger 2 and the electric heater 10 is blown toward a foot area of the driver in the vehicle compartment through the driver-foot air outlet 15. Similarly, the passenger-foot air outlet 18 is provided on the rear side of the duct 3, and conditioned air passed through the heating heat exchanger 2 and the electric heater 10 is blown toward a foot area of a front passenger in the vehicle compartment through the passenger-foot air outlet 18. The driver-foot door 16 opens or closes the driver-foot air outlet 15. The air conditioner 100 further includes a knee air outlet 17, which is arranged to be opposed to knees of the driver and to be opened or closed by the driver-foot door 16. Here, when the driver-foot door 16 fully opens the driver-foot air outlet 15, the knee air outlet 17 is closed. On the other hand, when the driver-foot door 16 closes the driver-foot air outlet 15, the knee air outlet 17 is fully opened. The air conditioner 100, more specifically, further includes a foot passage 26 provided at an downstream end of the lower space 4a in the air flow direction to connect the lower space 4a and both of the driver-foot air outlet 15 and the knee air outlet 17. The driver-foot door 16 is arranged in the foot passage 26 upstream of the driver-foot air outlet 15 and the knee air outlet 17 in the air flow direction.

The air conditioner 100 further includes a communication door 20, as shown in FIG. 1. By opening or closing the communication door 20, the lower and upper spaces 4a, 4b inside the duct 3 communicate or are partitioned from each other, and an air flow to the driver-foot air outlet 15 is controlled. Specifically, as shown in FIG. 1, the communication door 20 is arranged adjacent to the communication passage 23 through which the lower and upper spaces 4a, 4b communicate with each other inside the duct 3, and is located upstream of the driver-foot door 16 in the air flow direction.

When the communication door 20 closes the communication passage 23 as shown in FIG. 1, conditioned air flowing out of the electric heater 10 flows exclusively toward the lower area in the vehicle compartment.

In other words, when the communication door 20 is positioned to separate the lower space 4a and the upper space 4b inside the duct 3, conditioned air flowing out of the electric heater 10 can flow to the driver-foot air outlet 15 or/and the knee air outlet 17. That is, the communication door 20 opens the foot passage 26 when the communication door 20 closes the communication passage 23.

When the communication door 20 is controlled by an air conditioning controller 30 (NC ECU) to be positioned as shown by a dash line in FIG. 1, in other words, when the communication passage 23 is open, the lower space 4a and the upper space 4b in the duct 3 communicate with each other. Additionally, a flow of conditioned air toward the driver-foot air outlet 15 is interrupted. Thus, when the communication door 20 fully opens the communication passage 23, the communication door 20 closes the foot passage 26 so that air does not flow from the driver-foot air outlet 15 and the knee air outlet 17.

The air conditioner 100 further includes the air conditioning controller 30, an air conditioning control panel 31 provided in an instrumental panel of the vehicle, and an immediate heating switch 32 provided in the control panel 31. The air conditioning controller 30 controls the blower, the electric heater 10 and a door device. The door device includes the defroster door 12, the face door 14, the driver-foot door 16 and the communication door 20.

The air mix doors 5, 6 and the door device, such as the defroster door 12, the face door 14, the driver-foot door 16 and the communication door 20 are provided with an electric actuator in the duct 3. The air conditioning controller 30 controls the electric actuator by a control signal outputted from the control panel 31. Therefore, by operating the immediate heating switch 32 provided in the control panel 31, an immediate heating operation can be switched and performed.

In FIG. 2, the DEF indicates a space in the duct 3 located immediately upstream of the defroster air outlet 11 in the air flow direction, and the FACE indicates a space in the duct 3 located immediately upstream of the face air outlet 13 in the air flow direction.

As shown in FIG. 1, the face air outlet 13 is closed in the state of FIG. 2. The FRONT-SEAT FOOT in FIG. 2 indicates a space in the duct 3, and air flows through the space of the FRONT-SEAT FOOT when the air is blown to the driver seat through the driver-foot air outlet 15, and when the air is blown to a front-passenger seat through the passenger-foot air outlet 18 provided on a front side of the front-passenger seat.

The driver-foot door 16 is located on a right side in FIG. 2, and opens or closes the driver-foot air outlet 15. When the driver-foot door 16 closes the driver-foot air outlet 15, conditioned air flows to the knee air outlet 17.

Conditioned air can be blown to the passenger-foot air outlet 18 through the space of the FRONT-SEAT FOOT in the duct 3, and the passenger-foot door 19 is provided upstream of the passenger-foot air outlet 18 in the air flow direction to open or close the passenger-foot air outlet 18.

In a state shown in FIG. 2, the passenger-foot air outlet 18 is closed. The driver-foot door 16 and the passenger-foot door 19 are operatively linked with each other to be operated in like wise.

Because FIG. 1 shows the driver-seat part of the air conditioner 100, the driver-foot door 16 and the driver-foot air outlet 15 are shown in FIG. 1, but the passenger-foot air outlet 18 and the passenger-foot door 19 are not shown in FIG. 1. The knee air outlet 17 is provided for the driver seat, but is not provided for the front-passenger seat.

The REAR-SEAT FOOT shown in FIG. 2 is a space in the duct 3 through which conditioned air is blown to a foot area of a passenger sitting on a rear seat in the vehicle compartment. In FIG. 1, an air passage, through which the conditioned air flows toward the rear seat, is not shown. The blowing of the conditioned air to the rear seat may be not provided.

Figure 3:
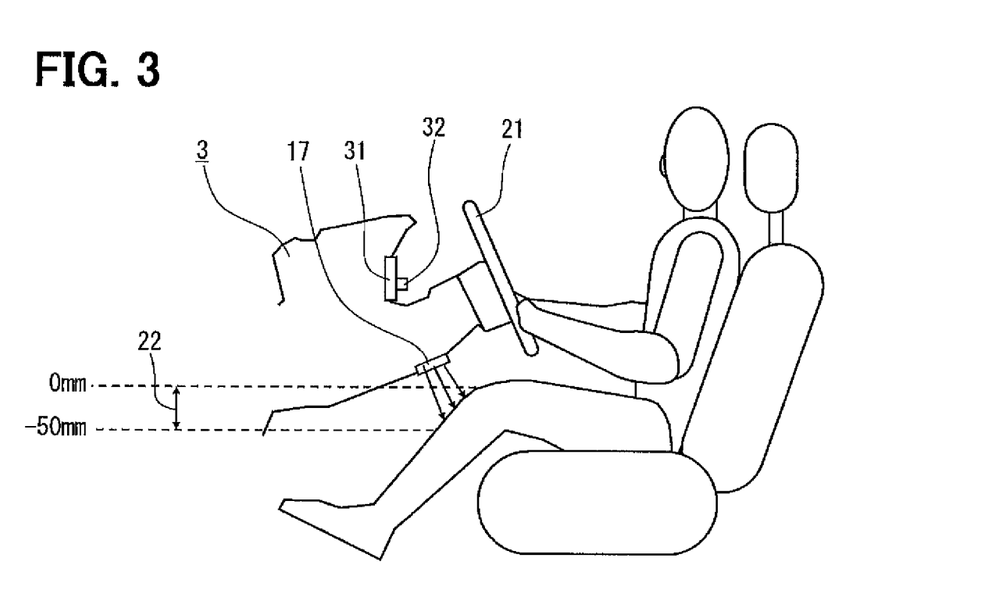
FIG. 3 is a schematic diagram showing a state where a driver sits on the driver seat in the vehicle compartment and operates a steering wheel of the vehicle, according to the first embodiment.

As shown in FIG. 3, the duct 3 of the air conditioner 100 is located on a front side of a steering wheel 21 of the vehicle, and conditioned air is blown to a knee area of the driver from the knee air outlet 17.

As shown in FIG. 3, a range of a leg of the driver sitting on the driver seat, to which the conditioned air is blown from the knee air outlet 17, is referred to as a knee air-blowing range 22. The knee air-blowing range 22 extends, for example, downward by 50 mm from a top surface of a thigh at an upper side of a knee cap of the driver when a position of the top surface of the thigh at an upper side of the knee cap of the driver is defined as 0 mm.

Figure 4:
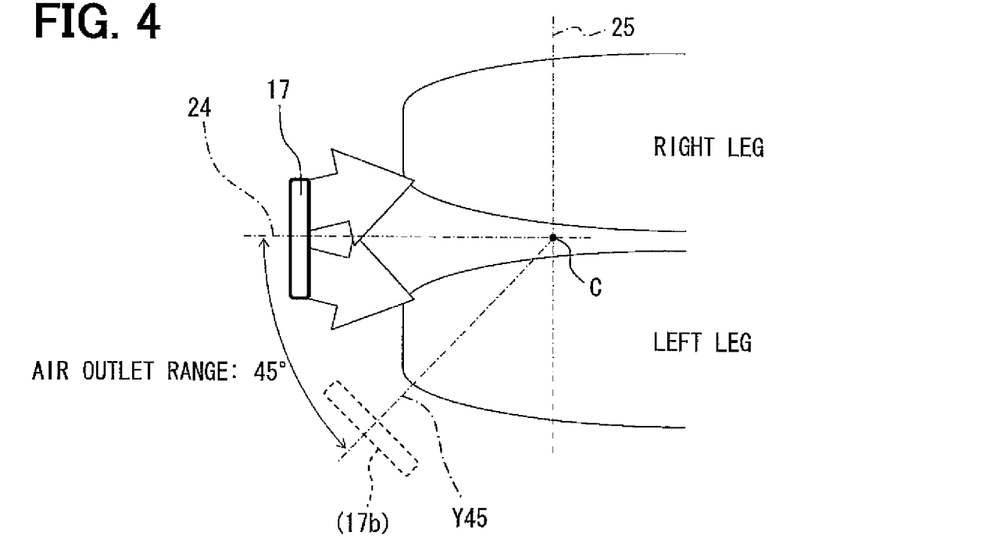
FIG. 4 is a schematic diagram showing thighs of both legs of the driver when being viewed from a ceiling of the vehicle, and showing an air outlet range within which a knee air outlet is located, according to the first embodiment.

As shown in FIG. 4, the knee air outlet 17 is positioned within an air outlet range, and the air outlet range is an angular range from 0° to 45° with respect to a line 24 toward the front-passenger seat, i.e., leftward. The line 24 is a straight line extending in the front-rear direction over a center point (seat center point) between the right and left thighs of the driver. Specifically, the knee air outlet 17 is positioned on a straight line that is obtained by rotating the line 24 around a point C within the angular range from 0° to 45° toward the front-passenger seat. The point C is an intersection point between the line 24 and a line 25 shown in FIG. 4, and the line 25 is a straight line extending in a right-left direction of the vehicle over a center point between a knee cap of a leg and a base of the leg. In FIG. 4, the knee air outlet 17 is located at a position corresponding to the seat center point between the left thigh and the right thigh of the driver, in other words, the knee air outlet 17 is located on the straight line 24.

The knee air outlet 17 may be located at a position of 45°, i.e., a position assigned a numeral "(17b)" in FIGS. 2 and 4. In other words, the knee air outlet 17 may be arranged on a dash line Y45 shown in FIG. 4. A knee air outlet may be arranged at the position (17b) additionally. A single knee air outlet may be arranged at any position within the air outlet range from 0° to 45°, or a plurality of knee air outlets may be provided within the air outlet range.

A control process of the air conditioning controller 30 will be described with reference to FIG. 5. At step S1, the air conditioning controller 30 determines whether the immediate heating switch 32 provided in the control panel 31 connected to the air conditioning controller 30 is ON.

When the immediate heating switch 32 is not ON at step S1, a control operation of step S2 is performed. At step S2, the air conditioning controller 30 determines whether (i) an outside air temperature TAM that is a temperature of air outside the vehicle is lower than a reference temperature T1, (ii) an inside air temperature TIN that is a temperature of air inside the vehicle compartment is lower than a reference temperature T2, and (iii) a temperature TW of coolant which cools an engine of the vehicle is lower than a reference temperature T3. Here, the reference temperature T1 is lower than the reference temperature T2 that is lower than the reference temperature T3 (T1<T2<T3).

When at least one of the three temperatures, which are the outside air temperature TAM, the inside air temperature TIN and the coolant temperature TW, is lower than the corresponding reference temperature T1, T2, T3 at step S2, a control operation of step S3 is performed. At step S3, the air conditioning controller 30 determines an air outlet mode and a blower level relating an air blowing amount of the blower depending on a target temperature (target outlet temperature TAO) of air flowing through an air outlet of the air conditioner 100. Here, the target outlet temperature TAO is calculated based on a preset temperature, a solar radiation amount, and the inside air temperature TIN, as is known in the art.

When the outside air temperature TAM, the inside air temperature TIN and the coolant temperature TW are lower respectively than the reference temperature T1, the reference temperature T2 and the reference temperature T3 at step S2, it is too cold in the vehicle compartment, and a control operation of step S4 is performed. At step S4, the air outlet mode is set in a defroster mode, and the blower level is set at extremely low level, so that a small amount of conditioned air is blown out only of the defroster air outlet 11 into the vehicle compartment.

At step S1, when the immediate heating switch 32 is ON, the air conditioning controller 30 determines whether the temperature TW of coolant of the engine is higher than a reference temperature T4 at step S5. Here, the reference temperature T4 is higher than the reference temperature T3 (T3<T4). When the coolant temperature TW is higher than the reference temperature T4 at step S5, the electric heater 10 shown in FIG. 1 is energized at step S6.

Subsequently, at step S7, the air outlet mode is set in a foot/defroster mode in which conditioned air can be blown through the defroster air outlet 11 and at least one of the driver-foot air outlet 15 and the knee air outlet 17. In other words, the communication door 20 closes the communication passage 23, and the defroster door 12 opens the defroster air outlet 11. At step S7, the air outlet mode may be set in a foot mode because some amount of conditioned air is generally blown out of the defroster air outlet 11 in the foot mode.

At step S7, the blower level, by which the air blowing amount of the blower is determined, is set in an immediate mode appropriate for the immediate heating operation. The air blowing amount in the immediate mode is generally larger somewhat than that at the extremely low level. When the blower level is set at a high level to blow a large amount of conditioned air, it may work negatively for the immediate heating operation. Thus, the high level is generally not selected in the immediate mode. Here, a blower level in the immediate mode is a predetermined blower level, and does not relate to the target outlet temperature TAO. In the immediate mode, the air conditioning controller 30 determines a flow amount of air passing through the electric heater 10 and flowing out of the duct 3 generally to be smaller in the immediate heating operation than that before the immediate heating operation is performed by operating the immediate heating switch 32. Therefore, the air conditioning controller 30 can be used as an example of an air flow amount control portion which controls the flow amount of air passing through the electric heater 10 and flowing out of the duct 3 to be smaller in the immediate heating operation than that before the immediate heating operation is performed. The air conditioning controller 30 may control the flow amount of air by adjusting a rotation speed of the blower or by controlling the door device.

Additionally, at step S7, the driver-foot door 16 shown in FIG. 1 closes the driver-foot air outlet 15 so that conditioned air passed through the electric heater 10 is blown out of the duct 3 through the knee air outlet 17 into the vehicle compartment. In this case, the communication door 20 is positioned as shown in FIG. 1 to close the communication passage 23, so that the lower and upper spaces 4a and 4b are separated from each other by the partition plate 4 and the communication door 20.

Figure 5:
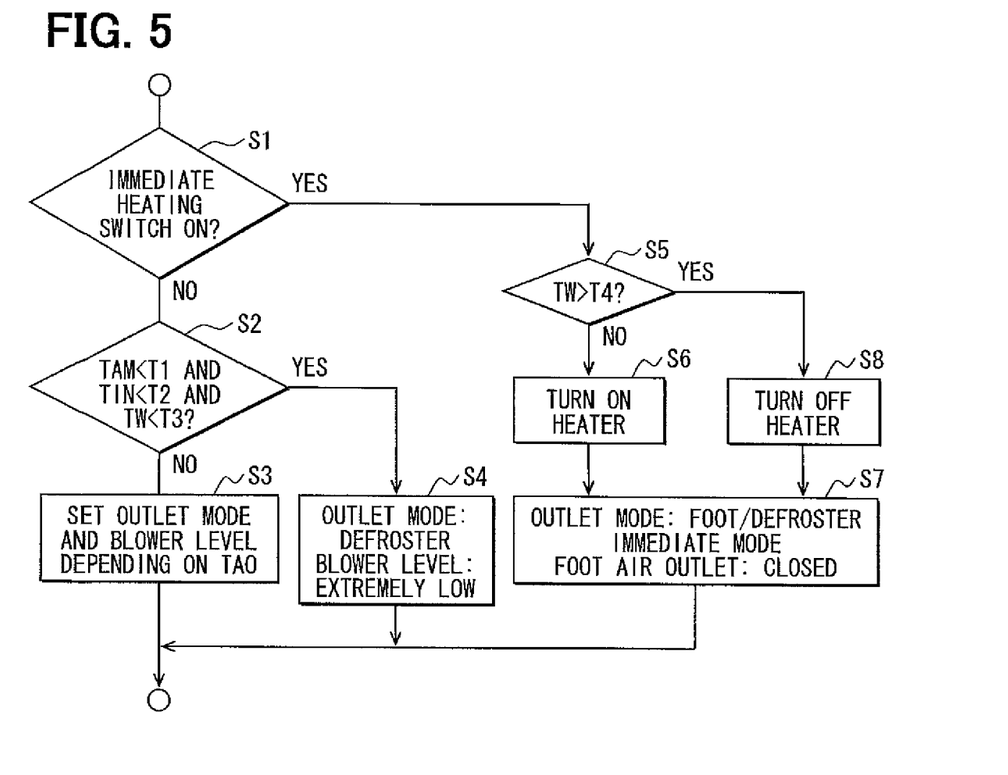
FIG. 5 is a flowchart showing a control process of an air conditioning controller for the air conditioner according to the first embodiment.

At step S5 shown in FIG. 5, when the coolant temperature is sufficiently high, in other words, when the coolant temperature is higher than the reference temperature T4, the electric heater 10 is turned OFF at step S8. Subsequently, the immediate heating operation is performed at step S7 by using warm air passed through the heating heat exchanger 2.

Figure 6:
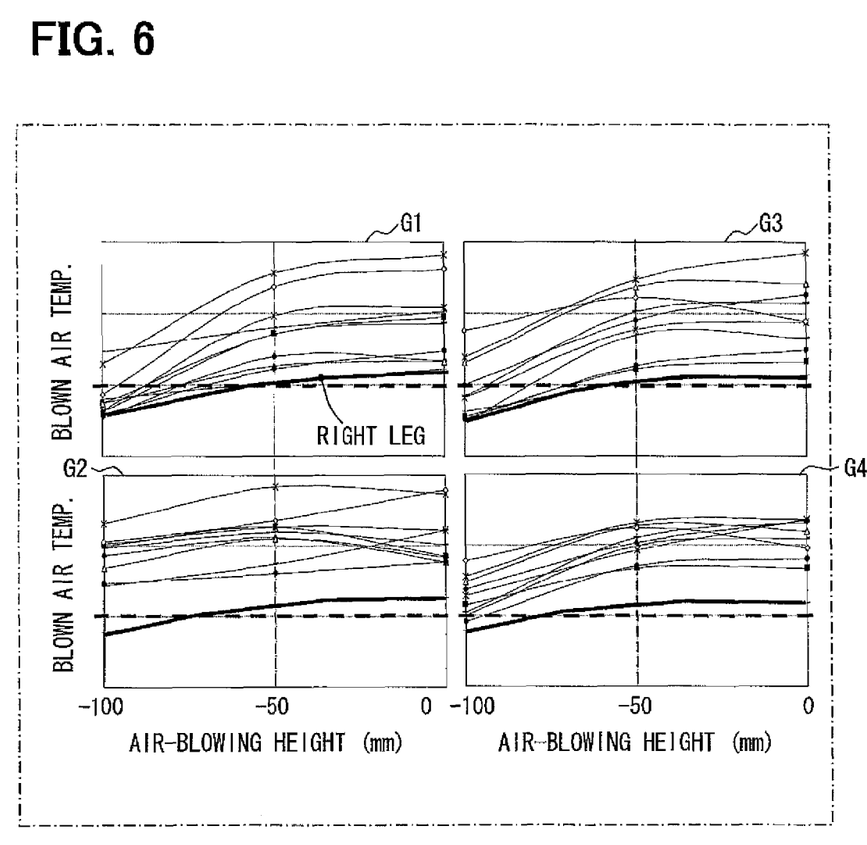
FIG. 6 is a diagram showing an effect of an immediate heating operation performed by the air conditioner according to the first embodiment.

G1 and G2 graphs in FIG. 6 are in conditions in which the knee air outlet 17 is provided on the front side of the center point between the right and left legs of the driver. G3 and G4 graphs on right side in FIG. 6 are in conditions in which the knee air outlet 17 is provided on the dash line Y45 shown in FIG. 4. The dash line Y45 is obtained by rotating the straight line 24 around the point C by 45° toward the front-passenger seat. In the G3 and G4 graphs, the knee air outlet 17 is located at the position (17b).

As described above, in the case of the left-45° blowing shown by G3 and G4, conditioned air can be blown from a position relatively near to the front-passenger seat. Hence, conditioned air can be blown toward the knee of the driver from a position relatively near to a center of the duct 3 of the air conditioner 100. Therefore, a heat loss amount of conditioned air due to passing through the foot passage 26 in the duct 3 can be reduced.

In FIG. 6, the upper two graphs G1 and G3 are in conditions in which the air blowing amount is relatively low, and the lower two graphs G2 and G4 are in conditions in which the air blowing amount is relatively high. In each graph G1-G4 in FIG. 6, an axis of ordinate shows a blown air temperature that is a temperature of air blown to the knee of the driver, and an axis of abscissa shows an air blowing height. The air blowing height is a height range of an area of the leg of the driver toward which conditioned air is blown from the knee air outlet 17, and the air blowing height includes the above-described knee air-blowing range 22 that is a height from 0 mm to −50 mm. Thus, the reason why the height 0 mm to −50 mm is adopted as the knee air-blowing range 22 can be explained based on FIG. 6. The plural curves in FIG. 6 show temperatures detected by thermocouples arranged on various positions of the knee of the driver.

The temperature shown by the bold dash line in each graph G1-G4 of FIG. 6 is a desired temperature of blown air, at least at which the blown air temperature is desired to be kept. As shown in FIG. 6, in both cases of high air blowing amount and low air blowing amount, the blown air temperature is likely to be lower than the desired temperature when the air blowing height is lower than −50 mm. Within a range of the air blowing height from 0 mm to −50 mm, the blown air temperature is easy to be kept equal to or higher than the desired temperature. The range of the air blowing height from 0 mm to −50 mm is appropriate for the knee air-blowing range 22.

In other words, it is easy to heat the knee of the driver by using air having a temperature equal to or higher than the desired temperature when conditioned air from the knee air outlet 17 is blown toward the air blowing height range from 0 mm to −50 mm in both cases of the center blowing and the left 45° blowing, and in both cases of the high blowing mount and the low blowing amount. Here, the air blowing height of 0 mm is a height of an upper surface of the thigh of the drive, and the air blowing height of −50 mm is below the air blowing height of 0 mm. Therefore, in any case G1, G2, G3, G4 shown in FIG. 6, it is easy to heat the knee of the driver when the air blowing height range is limited to a range from 0 mm to −50 mm.

Figure 7:
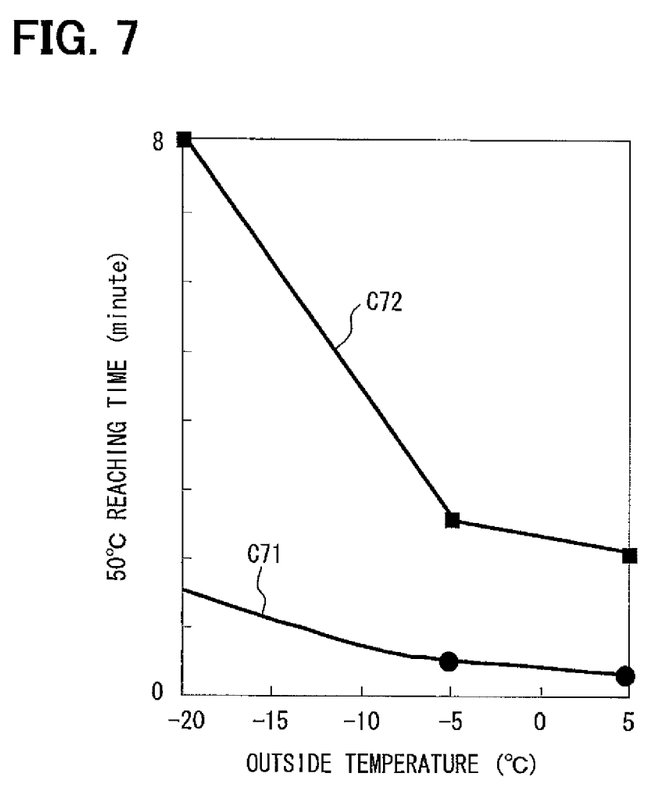
FIG. 7 is a characteristic diagram showing a comparison between the air conditioner according to the first embodiment and an air conditioner according to a comparative example.

In FIG. 7, an axis of ordinate shows a 50° C. reaching time for which a temperature of air (outlet air) blown out of a foot air outlet reaches 50° C., and an axis of abscissa shows a temperature (outside temperature) of air outside the vehicle compartment.

A range of the outside temperature is from 5° C. to −20° C. in FIG. 7. A curve C71 in FIG. 7 shows a change of the 50° C. reaching time in the above-described first embodiment. A curve C72 in FIG. 7 shows a change of the 50° C. reaching time in a comparative example. In the comparative example, air heated in an electric heater is mixed with air not-heated in the electric heater before being blown through the foot air outlet even when a temperature of the air not-heated in the electric heater is low.

In FIG. 7, the 50° C. reaching time increases in accordance with reduction of the outside temperature in both cases of the first embodiment and the comparative example. However, the 50° C. reaching time is much smaller in the first embodiment than in the comparative example.

At a temperature below around −5° C., the 50° C. reaching time has a tendency to increase sharply in the comparative example. On the other hand, in the above-described first embodiment, the 50° C. reaching time does not increase sharply.

The reason of the difference between the first embodiment and the comparative example will be described. In the above-described first embodiment, all of the heat from the electric heater 10 is delivered with conditioned air that is to be blown out of the knee air outlet 17. Hence, sharp increase of the 50° C. reaching time is limited. In the comparative example, a temperature of air to be blown out of an air outlet is increased by a part of heat generated in the electric heater and by heat generated in a heater core used as a heating heat exchanger. That is the air to be blown out of the air outlet is air combined with air heated in the electric hater and air not-heated in the electric heater.

Here, a temperature of engine coolant flowing inside the heating heat exchanger generally has a tendency to increase moderately and be saturated when the outside temperature is low. Because of the influence of the moderate increase of the engine coolant temperature, the 50° C. reaching time tends to increase sharply at the outside temperature lower than −5° C. in the comparative example.

In the present embodiment, because all the heat generated in the electric heater can be delivered to an air outlet with air, the 50° C. reaching time does not increase sharply even when the outside temperature is low.

In the comparative example, the 50° C. reaching time tends to increase sharply around at −5° C. of the outside temperature. On the other hand, the sharp increase of the 50° C. can be limited in the above-described first embodiment.

As described above, in the first embodiment, air heated in the electric heater 10 is blown toward the knee area of the driver through the knee air outlet 17 without mixed with air not heated by the electric heater 10. Moreover, not only the air heated by the electric heater 10 is blown out of the air conditioner 100, and also the air not heated in the electric heater 10 is blown out of the air conditioner 100 through the defroster air outlet 11. Hence, air passing through the electric heater 10 can be reduced in amount, and can be thereby increased in temperature.

Because conditioned air passed through the heating heat exchanger 2 is blown out of the duct 3 through the defroster air outlet 11, the windshield can be prevented from misting. Additionally, the blower blows a total amount of conditioned air blown into the vehicle compartment, which is the sum of an air amount passing through the electric heater 10 and an air amount passing the defroster air outlet 11. Thus, air amount flowing in the duct 3 from the blower can be ensured sufficiently. As a result, turbulence of air due to a small amount of the air in the duct 3 and noise generation caused by the turbulence of air can be prevented. Here, the noise is induced by a phenomenon so called surging, in which, a blown conditioned air amount fluctuates and the noise is generated intermittently.

In the first embodiment, warm air can be blown intensively to the driver through the knee air outlet 17 when the driver-foot air outlet 15 is closed by operating the driver-foot door 16. Hence, a performance of the air conditioner 100 to warm the driver can be improved, and an effect of the immediate heating operation can be thereby enhanced. Moreover, warm air cannot be blown to the foot area of the driver, but can be blown to the knee that is a warm-sensitive part of the driver. Thus, warm feeling of the driver can be improved. Consequently, a time period it takes for the driver to feel warm can be reduced.

Second Embodiment

A second embodiment will be described. In following embodiments, a part same as a part of the first embodiment is assigned the same numeral as the corresponding part of the first embodiment, and a description of the part is omitted. A part different from the first embodiment will be described.

In the second embodiment, a capacity of the electric heater 10, i.e., a largest heating capacity of the electric heater 10 is relatively low. When the coolant temperature is too low, air to be blown to the driver in the vehicle compartment may not be heated sufficiently because of the small capacity of the electric heater 10. Therefore, in the second embodiment, the air conditioning controller 30 determines whether the immediate heating operation is performed, based on the temperature of the engine coolant. Accordingly, cool air is prevented from being blown to the driver in the vehicle compartment.

The electric heater 10 has a limitation in capacity (wattage). When the capacity of the electric heater 10 is large sufficiently, the electric heater 10 is suitable for the first embodiment. In the second embodiment, the capacity of the electric heater 10 is assumed to be smaller than that in the first embodiment.

Figure 8:
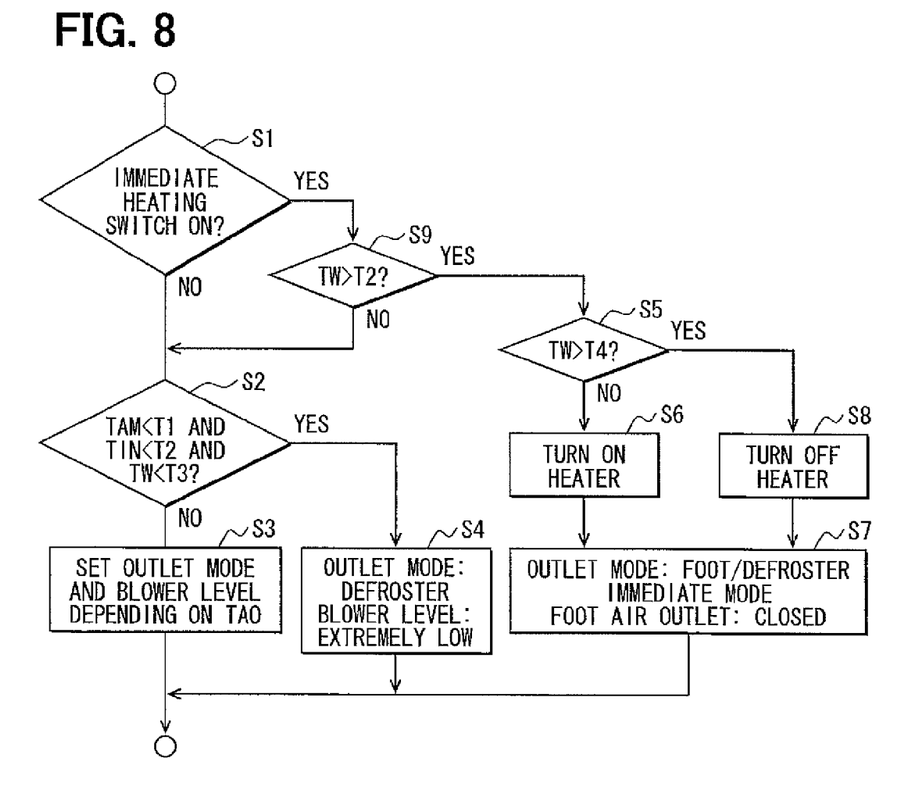
FIG. 8 is a flowchart showing a control process of an air conditioning controller according to a second embodiment of the present disclosure.

As shown in FIG. 8, the air conditioning controller 30 determines whether the coolant temperature TW is higher than the reference temperature T2 at step S9 in the second embodiment, which is a different point from FIG. 5 of the first embodiment. Thus, in a case where the immediate heating switch 32 is turned ON, the control operation of step S5 is performed when the coolant temperature TW is higher than the reference temperature T2 at step S9. When the coolant temperature TW is not higher than the reference temperature T2 at step S9, the control operation of step S2 is performed.

Accordingly, when the coolant temperature TW is equal to or lower than the reference temperature T2 at step S9, the immediate heating operation cannot be performed even by an operation of the immediate heating switch 32. Therefore, cool air is prevented from being blown to the knee of the driver. In this case, a message "immediate heating operation is stopped because the coolant temperature is low" may be displayed for the driver in order not to provide uncomfortable feeling to the driver.

Third Embodiment

A third embodiment will be described. Parts different from the above-described embodiments will be described in the present embodiment. The electric heater 10 generally requires hundreds of watts of electricity. Hence, there is a case that energization of the electric heater 10 is required to be stopped because of reduction of a remaining capacity of a battery, for example.

If the energization of the electric heater 10 is stopped without any notice, a user such as a driver may confuse, and may be unsatisfied with the stop of the energization. However, it may be not good to perform the immediate heating operation by energizing the electric heater 10 when the remaining capacity of the battery is low.

Thus, when a signal (energization stop command) to stop the energization of the electric heater 10 is outputted from a control device (battery monitor device) which monitors a state of the battery, the energization of the electric heater 10 may be stopped. In this case, a message "the immediate heating operation is waiting because of low battery power" may be displayed on the instrumental panel or may be informed in order to prevent the user such as the driver from thinking uncomfortably that the electric heater 10 is not energized despite an operation of the immediate heating switch 32.

In other words, contentment of the user may be ensured at the time of the stop of the energization of the electric heater 10 by displaying a battery caution which indicates a small amount of the battery power and by informing a risk of a power source to the user.

When the capacity of the battery is small, electric power may be used for driving a fan of a radiator of the engine to protect the engine, and may be used for a headlamp or the like of the vehicle to ensure driving safety, in priority to the energization of the electric heater 10.

A sequence of display operation of the air conditioning panel 31 in the third embodiment will be described. Firstly, as shown by a left diagram in FIG. 9, a message "HEATER ON" is displayed on a display screen of the air conditioning panel 31 when the immediate heating switch is turned ON. The message "HEATER ON" indicates that the electric heater 10 is energized by an energization command from the air conditioning controller 30.

Figure 9:
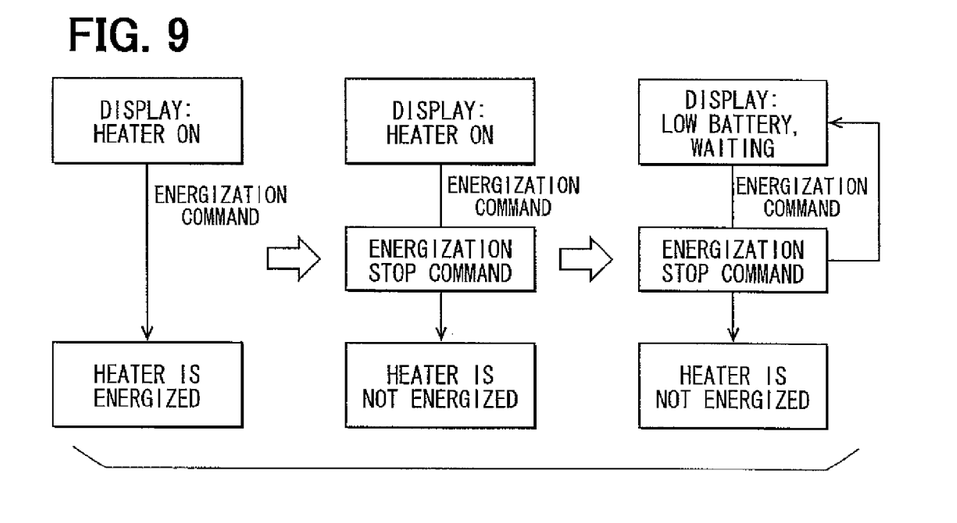
FIG. 9 is a schematic diagram showing a sequence of display operations of an air conditioning control panel according to a third embodiment of the present disclosure.

Secondly, as shown by a middle diagram in FIG. 9, the energization of the electric heater 10 is stopped in spite of the ON state of the immediate heating switch 32 because the energization stop command is outputted from the battery monitor device which determines the battery state. Therefore, at this time, the electric heater 10 is not energized even through the message "HEATER ON" is displayed on the air conditioning panel 31.

Lastly, as shown by a right diagram in FIG. 9, a message "low battery, waiting" is displayed on the display screen of the air conditioning panel 31 instead of the message "HEATER ON" in order to inform the user that the electric heater 10 is not energized despite the turning ON of the immediate heating switch 32.

Although the present disclosure has been fully described in connection with the preferred embodiments thereof with reference to the accompanying drawings, the present disclosure is not limited to the above-described embodiments, and it is to be noted that various changes and modifications will become apparent to those skilled in the art. For example, in the first embodiment, as shown in FIG. 2, the driver-foot door 16 and the passenger-foot door 19 are moved similarly to each other. Here, a shaft of the driver-foot door 16 and a shaft of the passenger-foot door 19 may be connected to each other via a shaft, and the both doors 16, 19 may be opened or closed by using a single motor.

Alternatively, the shaft of the driver-foot door 16 and the shaft of the passenger-foot door 19 may be connected to each other via a wire, and the both doors 16, 19 may be opened or closed by using a single motor.

Alternatively, a shaft of a rear-seat foot door, the shaft of the driver-foot door 16 and the shaft of the passenger-foot door 19 may be connected to each other via a wire, and all of the doors: the rear-seat foot door, the driver-foot door 16 and the passenger-foot door 19 may be opened or closed by using a single motor which drives the rear-seat foot door. Here, the rear-seat foot door opens or closes an air passage through which conditioned air is blown to a foot area of the rear seat.

In the above-described first embodiment, the present disclosure is applied to the vehicle air conditioner 100 in which the inside space of the duct 3 is separated into the upper and lower spaces 4b, 4a so that the inside-outside air double-layer mode can be set. In the inside-outside air double-layer mode, outside air flows through the upper space 4b, and inside air flows through the lower space 4a as described above. Accordingly, the effect of the immediate heating operation can be further improved. However, the present disclosure may be applied to a vehicle air conditioner in which the inside-outside air double-layer mode cannot be set.

The immediate heating operation may be commanded by switching operation or by automatic operation. In the case of the automatic operation, when a far infrared sensor detects entering of a person into the vehicle compartment, and when the outside temperature is equal to or lower than a predetermined temperature, the immediate heating operation may be performed automatically.

The air conditioner of the present disclosure may be described below.

The air conditioner for a vehicle includes the cooling and heating heat exchangers 1, 2 as examples of the air-conditioning heat exchanger, the electric heater 10, the defroster air outlet 11, the driver-foot air outlet 15, the knee air outlet 17, the door device (12, 14, 16, 20), and the immediate heating switch 32. The air-conditioning heat exchanger (1, 2) is arranged in the duct 3 inside the vehicle, and the air-conditioning heat exchanger (1, 2) is configured to exchange heat with air blown by the blower. The electric heater 10 is arranged downstream of the air-conditioning heat exchanger (1, 2) inside the duct 3 in the air flow direction, to heat air passing through the electric heater 10. The defroster air outlet 11 is provided downstream of the air-conditioning heat exchanger (1, 2) in the air flow direction to serve as a port through which air, passed through the air-conditioning heat exchanger (1, 2), is blown out of the duct 3 into the vehicle compartment toward the inner surface of the windshield of the vehicle. The driver-foot air outlet 15 is provided downstream of the electric heater 10 in the air flow direction to serve as a port through which air, passed through the air-conditioning heat exchanger (1, 2) and the electric heater 10, is blown out of the duct 3 into the vehicle compartment toward a foot area of a driver. The knee air outlet 17 is provided downstream of the electric heater 10 in the air flow direction to serve as a port through which air, passed through the air-conditioning heat exchanger (1, 2) and the electric heater 10, is blown out of the duct 3 into the vehicle compartment toward a knee area of the driver. The door device (12, 14, 16, 20) is configured to control an air amount blown into the vehicle compartment through the defroster air outlet 11, the driver-foot air outlet 15 and the knee air outlet 17 by opening or closing the defroster air outlet 11, the driver-foot air outlet 15 and the knee air outlet 17. The immediate heating switch 32 is operative to command an immediate heating operation. The door device (12, 14, 16, 20) opens the defroster air outlet 11 and at least one of the driver-foot air outlet 15 and the knee air outlet 17, and the electric heater 10 heats a total amount of air that is to be blown into the vehicle compartment through the at least one of the driver-foot air outlet 15 and the knee air outlet 17, when the immediate heating operation is performed.

In the above-described air conditioner, conditioned air passed through the air-conditioning heat exchanger (1, 2) can be further heated in the electric heater 10. Moreover, because conditioned air is blown through the defroster air outlet, the windshield can be prevented from misting. Additionally, the driver can be heated by air flowing out of the driver-foot air outlet 15 and/or the knee air outlet 17. Further, an air flow amount blown into the vehicle compartment can be adjusted by controlling the door device (12, 14, 16, 20). The electric heater 10 can be used effectively for immediate heating of the driver in the immediate heating operation. Therefore, when the immediate heating operation is commanded to be performed during an operation other than the immediate heating operation, a temperature of air blown through the air outlets can be increased at an early stage of the immediate heating operation, and warm air can be blown to the driver effectively.

When the immediate heating operation is performed, conditioned air can be blown out of the duct 3 through the defroster air outlet 11 to prevent the windshield from misting. Additionally, a sufficient air blowing amount of the blower can be ensured, and an air flow amount in the duct 3 can be thereby stabilized. Hence, noise of air, which is due to a small air flow amount, and a variation of air flow amount can be reduced. As a result, a comfortable immediate heating operation can be performed.

The door device (12, 14, 16, 20) may open the knee air outlet 17 to cause the total amount of air passed through the electric heater 10 to flow only toward the driver when the immediate heating operation is performed.

In this case, the immediate heating operation for the driver can be performed intensively and effectively.

The door device (12, 14, 16, 20) may include the driver-foot door 16 arranged upstream of the driver-foot air outlet 15 and the knee air outlet 17 in the air flow direction within the duct 3 to open or close the driver-foot air outlet 15 and the knee air outlet 17. The driver-foot door 16 may open the knee air outlet 17 when the driver-foot door 16 closes the foot air outlet door 15, and the driver-foot door 16 may open the foot air outlet door 15 when the driver-foot door 16 closes the knee air outlet 17.

In this case, when the driver-foot door 16 closes the driver-foot air outlet 15 and opens the knee air outlet 17, warm air passed through the electric heater 10 can be blown mainly toward the knee of the driver.

The door device (12, 14, 16, 20) may be configured, so that air passed only through the air-conditioning heat exchanger (1, 2) is blown into the vehicle compartment through the defroster air outlet 11, and air passed through the air-conditioning heat exchanger (1, 2) and the electric heater 10 is blown into the vehicle compartment through one of the driver-foot air outlet 15 and the knee air outlet 17, when the immediate heating operation is performed.

In this case, when the immediate heating operation is performed, conditioned air passed only through the air-conditioning heat exchanger (1, 2) can be blown through the defroster air outlet 11. Thus, heat of the electric heater 10 can be used exclusively for heating a lower part of the driver.

The air conditioner may further include an air conditioning controller 30 as an example of an air flow amount control portion. The air flow amount control portion (30) is configured to control a flow amount of air passing through the electric heater 10 and flowing out of the duct 3 so that the air flow amount is smaller in the immediate heating operation than that before the immediate heating operation is performed.

When an air flow amount is set, for example, at high level depending on the target outlet temperature TAO before the immediate heating operation is performed, the air flow amount can be set at a predetermined blower level in the immediate heating operation. The blower level in the immediate heating operation is independent of the target outlet temperature TAO and is smaller than the air flow amount at high level. Because air flows relatively slowly through the electric heater 10 in this case, the air passing through the electric heater 10 can be heated sufficiently.

The air flow amount control portion (30) may reduce the flow amount of air passing through the electric heater 10 and flowing out of the duct 3 by reducing a rotation speed of the blower or by reducing a flow amount of conditioned air blown into the vehicle compartment through control of the door device (12, 14, 16, 20).

In this case, the flow amount of air passing through the electric heater 10 and flowing out of the duct 3 can be reduced than that before the immediate heating operation is performed without any special configuration.

When the immediate heating operation is performed, the air, which passes through the air-conditioning heat exchanger (1, 2) and is blown out of the duct 3 through the defroster air outlet 11, may be outside air that is air outside the vehicle, and the air, which passes through the air-conditioning heat exchanger (1, 2) and the electric heater 10, may be inside air that is air inside the vehicle compartment.

In this case, conditioned air having a low humidity can be blown through the defroster air outlet 11, and the anti-misting effect on the windshield can be thereby improved. Additionally, the driver can be heated effectively because inside air is used for delivering the heat of the electric heater 10.

Additional advantages and modifications will readily occur to those skilled in the art. The disclosure in its broader terms is therefore not limited to the specific details, representative apparatus, and illustrative examples shown and described.

What is claimed is:

1. An air conditioner for a vehicle, comprising:
    an air-conditioning heat exchanger arranged in a duct inside the vehicle, the air-conditioning heat exchanger being configured to exchange heat with air blown by a blower;
    an electric heater arranged downstream of the air-conditioning heat exchanger inside the duct in an air flow direction, to heat air passing through the electric heater;
    a defroster air outlet provided downstream of the air-conditioning heat exchanger in the air flow direction to serve as a port through which air, passed through the air-conditioning heat exchanger, is blown out of the duct into a vehicle compartment toward an inner surface of a windshield of the vehicle;
    a driver-foot air outlet provided downstream of the electric heater in the air flow direction to serve as a port through which air, passed through the air-conditioning heat exchanger and the electric heater, is blown out of the duct into the vehicle compartment toward a foot area of a driver;
    a knee air outlet provided downstream of the electric heater in the air flow direction to serve as a port through which air, passed through the air-conditioning heat exchanger and the electric heater, is blown out of the duct into the vehicle compartment toward a knee area of the driver;

a door device configured to control an air amount blown into the vehicle compartment through the defroster air outlet, the driver-foot air outlet and the knee air outlet by opening or closing the defroster air outlet, the driver-foot air outlet and the knee air outlet;

an immediate heating switch operative to command an immediate heating operation; and a driver-foot door arranged upstream of the driver-foot air outlet and the knee air outlet in the air flow direction within the duct to open or close the driver-foot air outlet and the knee air outlet, wherein when the immediate heating switch is operated to perform the immediate heating operation, the door device opens the defroster air outlet, the driver-foot door closes the driver-foot air outlet and opens the knee air outlet, and the electric heater heats air that is to be blown into the vehicle compartment through only the knee air outlet.

2. The air conditioner according to claim 1, wherein the driver-foot door opens the knee air outlet to cause a total amount of air passed through the electric heater to flow only toward the driver when the immediate heating operation is performed.

3. The air conditioner according to claim 1, wherein the door device is configured, so that air passed only through the air-conditioning heat exchanger is blown into the vehicle compartment through the defroster air outlet, and air passed through the air-conditioning heat exchanger and the electric heater is blown into the vehicle compartment through the knee air outlet, when the immediate heating operation is performed.

4. The air conditioner according to claim 1, further comprising an air flow amount control portion configured to control a flow amount of air passing through the electric heater and flowing out of the duct so that the air flow amount is smaller in the immediate heating operation than that before the immediate heating operation is performed.

5. The air conditioner according to claim 4, wherein the air flow amount control portion reduces the flow amount of air passing through the electric heater and flowing out of the duct by reducing a rotation speed of the blower or by reducing a flow amount of conditioned air blown into the vehicle compartment through control of the door device.

6. The air conditioner according to claim 1, wherein
when the immediate heating operation is performed, the air, which passes through the air-conditioning heat exchanger and is blown out of the duct through the defroster air outlet, is outside air that is air outside the vehicle, and the air, which passes through the air-conditioning heat exchanger and the electric heater, is inside air that is air inside the vehicle compartment.

7. The air conditioner according to claim 1, further comprising:

a partition plate arranged inside the duct to partition an inside space of the duct into an upper space communicating with the defroster air outlet, and a lower space communicating with the driver-foot air outlet and the knee air outlet;

a communication passage provided in the partition plate, the upper space and the lower space communicating with each other through the communication passage; and a foot passage provided downstream of the lower space in the flow direction, the lower space communicating with both of the driver-foot air outlet and the knee air outlet through the foot passage, wherein the air-conditioning heat exchanger penetrates through the partition plate to be located in both the upper space and the lower space, the electric heater is located in the lower space, the door device includes a communication door arranged in the communication passage and arranged upstream of the foot passage to open or close the foot passage and the communication passage, the communication door closes the communication passage when the communication door opens the foot passage, and the communication door opens the communication passage when the communication door closes the foot passage, and the communication door closes the communication passage, and the door device opens the defroster air outlet, when the immediate heating operation is performed.

8. The air conditioner according to claim 1, wherein the air flowing out of the duct through the knee air outlet is blown toward a range of leg of the driver from a top surface of a thigh of the driver downward by a distance when the driver sits on a driver seat of the vehicle.

9. The air conditioner for a vehicle, according to claim 1, wherein the knee air outlet faces downwardly toward the knee area of the driver.

* * * * *